United States Patent
Stager et al.

(10) Patent No.: US 8,976,761 B2
(45) Date of Patent: Mar. 10, 2015

(54) HIGH DENSITY DEPLOYMENT USING TRANSMIT OR TRANSMIT-RECEIVE INTERFERENCE SUPPRESSION WITH SELECTIVE CHANNEL DIMENSION REDUCTION/ATTENUATION AND OTHER PARAMETERS

(71) Applicant: Cisco Technology, Inc., San Jose, CA (US)

(72) Inventors: Paul J. Stager, Akron, OH (US); Matthew A. Silverman, Shaker Heights, OH (US); Zhigang Gao, Richfield, OH (US); John Blosco, Norton, OH (US); Raghuram Rangarajan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 174 days.

(21) Appl. No.: 13/645,565

(22) Filed: Oct. 5, 2012

(65) Prior Publication Data

US 2014/0098681 A1     Apr. 10, 2014

(51) Int. Cl.
*H04W 4/00*     (2009.01)

(52) U.S. Cl.
USPC .......................................... 370/334; 370/338

(58) Field of Classification Search
CPC .... H04B 7/028; H04B 7/0413; H04B 7/0426; H04B 7/043; H04B 7/0434
USPC ......................................... 370/328, 334, 338
See application file for complete search history.

(56) References Cited

U.S. PATENT DOCUMENTS

| | | | |
|---|---|---|---|
| 7,117,018 B2 | 10/2006 | Lewis | |
| 7,424,268 B2 | 9/2008 | Diener et al. | |
| 7,561,904 B2 * | 7/2009 | Lagnado | 455/575.7 |
| 7,680,457 B2 | 3/2010 | Jin et al. | |
| 8,059,744 B2 | 11/2011 | Jin et al. | |
| 8,134,503 B2 | 3/2012 | Na et al. | |
| 8,254,845 B2 | 8/2012 | Na et al. | |
| 8,295,384 B2 | 10/2012 | Stager et al. | |
| 2007/0099571 A1 * | 5/2007 | Withers et al. | 455/67.11 |
| 2010/0246461 A1 * | 9/2010 | Hsieh et al. | 370/311 |
| 2011/0012787 A1 | 1/2011 | Na et al. | |
| 2011/0026441 A1 * | 2/2011 | Diener et al. | 370/260 |
| 2011/0026630 A1 * | 2/2011 | Stager et al. | 375/267 |
| 2011/0306297 A1 * | 12/2011 | Chang et al. | 455/41.2 |
| 2012/0034874 A1 * | 2/2012 | Yiu et al. | 455/63.1 |

(Continued)

OTHER PUBLICATIONS

Nikolaidis, et al., "Cone of Silence: Adaptively Nulling Interferers in Wireless Networks," UCL Department of Computer Science, Research Note RN/10/02, Jan. 30, 2010, pp. 1-14.

*Primary Examiner* — Farah Faroul
(74) *Attorney, Agent, or Firm* — Edell, Shapiro & Finnan, LLC

(57) ABSTRACT

In a wireless local are network, each of multiple access points, in a high density deployment, are configured to suppress co-channel interference. A first access point having a plurality of antennas beamforms a transmission to a wireless client device within a null-space or with the weakest singular eigenmodes of a wireless channel between the first access point and at least one co-channel second access point. Techniques are presented herein for situations in which any given access point has two or more co-channel access points. In addition, an access point may perform receive side suppression with respect to a transmission (made by a co-channel access point to one of its associated wireless client devices) that is received from that co-channel access point.

36 Claims, 6 Drawing Sheets

(56) References Cited

U.S. PATENT DOCUMENTS

| | | | |
|---|---|---|---|
| 2012/0087332 A1* | 4/2012 | Kim et al. | 370/329 |
| 2012/0122502 A1* | 5/2012 | Shin et al. | 455/501 |
| 2012/0214403 A1* | 8/2012 | Shany et al. | 455/1 |
| 2012/0264388 A1 | 10/2012 | Guo et al. | |
| 2013/0012134 A1* | 1/2013 | Jin et al. | 455/62 |
| 2013/0044703 A1* | 2/2013 | Trainin | 370/329 |
| 2013/0215938 A1* | 8/2013 | Hansen et al. | 375/219 |
| 2013/0329619 A1* | 12/2013 | Carty et al. | 370/311 |

* cited by examiner

US 8,976,761 B2

HIGH DENSITY DEPLOYMENT USING TRANSMIT OR TRANSMIT-RECEIVE INTERFERENCE SUPPRESSION WITH SELECTIVE CHANNEL DIMENSION REDUCTION/ATTENUATION AND OTHER PARAMETERS

TECHNICAL FIELD

The present disclosure relates to wireless networks and devices.

BACKGROUND

In some wireless local area network (WLAN) deployments, such as enterprise deployments, there is a high density of access points (APs). For example, the AP-to-AP spacing can be less than 30 feet to restrict the maximum number of clients per AP. Such deployments have strong AP-to-AP co-channel interference, especially in the 2.4 GHz radio frequency band with only 3 non-overlapping 20 MHz channels.

Newer WLAN standards, such as IEEE 802.11n and IEEE 802.11ac, allow for APs to transmit multiple spatial streams simultaneously to a client, and thereby improve the throughput to that client. In a high density WLAN deployment, one and two spatial stream downlinks are optimal due to the number of 1×1 (single antenna, single transmitter and single receiver) and 2×2 (two antennas, two receivers and two transmitters) devices in use (e.g., WLAN-capable phones and low/mid-tier laptops) in far excess over the higher tier 3×3 (three antennas, three receivers and three transmitters) laptops needed for three spatial stream performance. High density networks are naturally biased toward one or two spatial stream operation.

It is common to set AP transmit power high in order to provide good downlink signal-to-noise ratio (SNR) at the client. Higher transmitter power also increases AP-to-AP co-channel interference. The AP-to-AP co-channel interference causes the adjacent AP to hold off from making a downlink transmission, according to energy detect clear channel assessment and/or the receiver in the adjacent AP starting to decode the co-channel AP's signal. In addition, if the adjacent AP is attempting to decode an uplink frame, the interference may degrade signal-to-interference-plus-noise ratio (SINR) and result in an increase forward error correction. As a result, AP transmit power is set lower to avoid AP-to-AP co-channel interference, sacrificing the quality link from the AP to its client.

DESCRIPTION OF EXAMPLE EMBODIMENTS

Overview

In a wireless local area network, each of multiple access points, in a high density deployment, are configured to suppress co-channel interference. A first access point having a plurality of antennas beamforms a transmission to a wireless client device within a null-space or with the weakest singular eigenmodes of a wireless channel between the first access point and at least one co-channel second access point. Techniques are presented herein for situations in which any given access point has two or more co-channel access points. In addition, an access point may perform receive side suppression with respect to a transmission (made by a co-channel access point to one of its associated wireless client devices) that is received from that co-channel access point.

Example Embodiments

Figure 1:
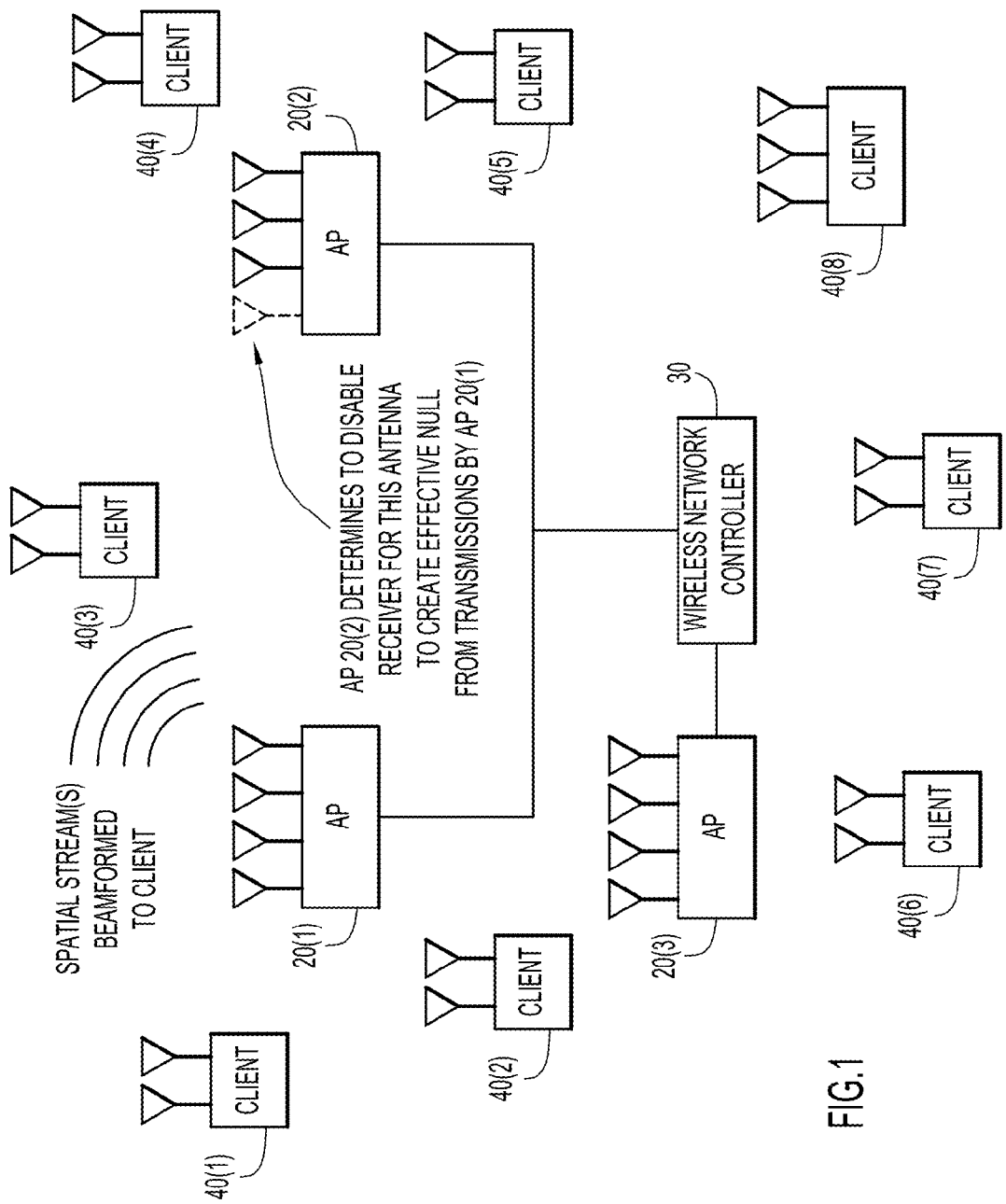
FIG. 1 is a diagram illustrating an example of a wireless local area network in which multiple co-channel access points suppress co-channel interference from each other according to the techniques described herein.

Referring first to FIG. 1, an example diagram is shown of a wireless local area network (WLAN) deployment 10 in which there is a high density of co-channel access points (APs). In the simplified example of FIG. 1, three APs 20(1), 20(2) and 20(3) are shown, each of which connects to a wireless network controller 30 by a wired local area network, for example. The physical separation between APs 20(1)-20(3) may be as little as 30 feet, or even less.

There is a plurality of wireless client devices ("clients") in FIG. 1, served by the APs 20(1)-20(3). For example, clients 40(1), 40(2) and 40(3) are served by AP 20(1), clients 40(4) and 40(5) are served by AP 20(2) and clients 40(6), 40(7) and 40(8) are served by AP 20(3). Again, FIG. 1 is only a simplified example for purposes of this description, and in a typical high density WLAN deployment there are numerous APs and associated clients.

Techniques are presented herein to maximize lower order spatial stream communication sessions (e.g., 1,2-spatial streams) system capacity while maintaining a basic level of higher order (e.g., 3-spatial streams) performance through cooperative adjustment of AP multiple-input multiple-output (MIMO) configuration, transmit pre-coding, transmit power, receive start-of-packet (SOP) threshold and clear channel assessment (CCA) threshold.

An AP selectively disables or attenuates receiver paths to reduce the AP-to-AP channel rank in order to create an effective null-space between co-channel APs while allowing sufficient dimensionality for AP-to-Client transmissions of more than one spatial stream. The receive SOP and CCA threshold levels are dynamically adjusted based on required AP-to-Client coverage and expected AP-to-AP co-channel interference suppression. Four transmit degrees of freedom are utilized to beamform to clients while suppressing AP-to-AP interference. Transmit power is adjusted based on expected (average) link margin while transmitting within the AP-to-AP null-space. Each AP determines which receiver path to disable/attenuate from implicit sounding knowledge of the channel, then based on that determination adjusts the explicit feedback channel state information (CSI) sent in response to the neighboring AP's sounding frame. For example, as depicted in FIG. 1, AP 20(2) determines to disable a receiver for a particular antenna to create an effective null from transmissions by AP 20(1). In this way, explicit sounding is utilized for transmit pre-coding and implicit sounding is used to select the receiver paths to attenuate in order to reduce AP-to-AP channel rank and/or conditioning.

Figure 2:
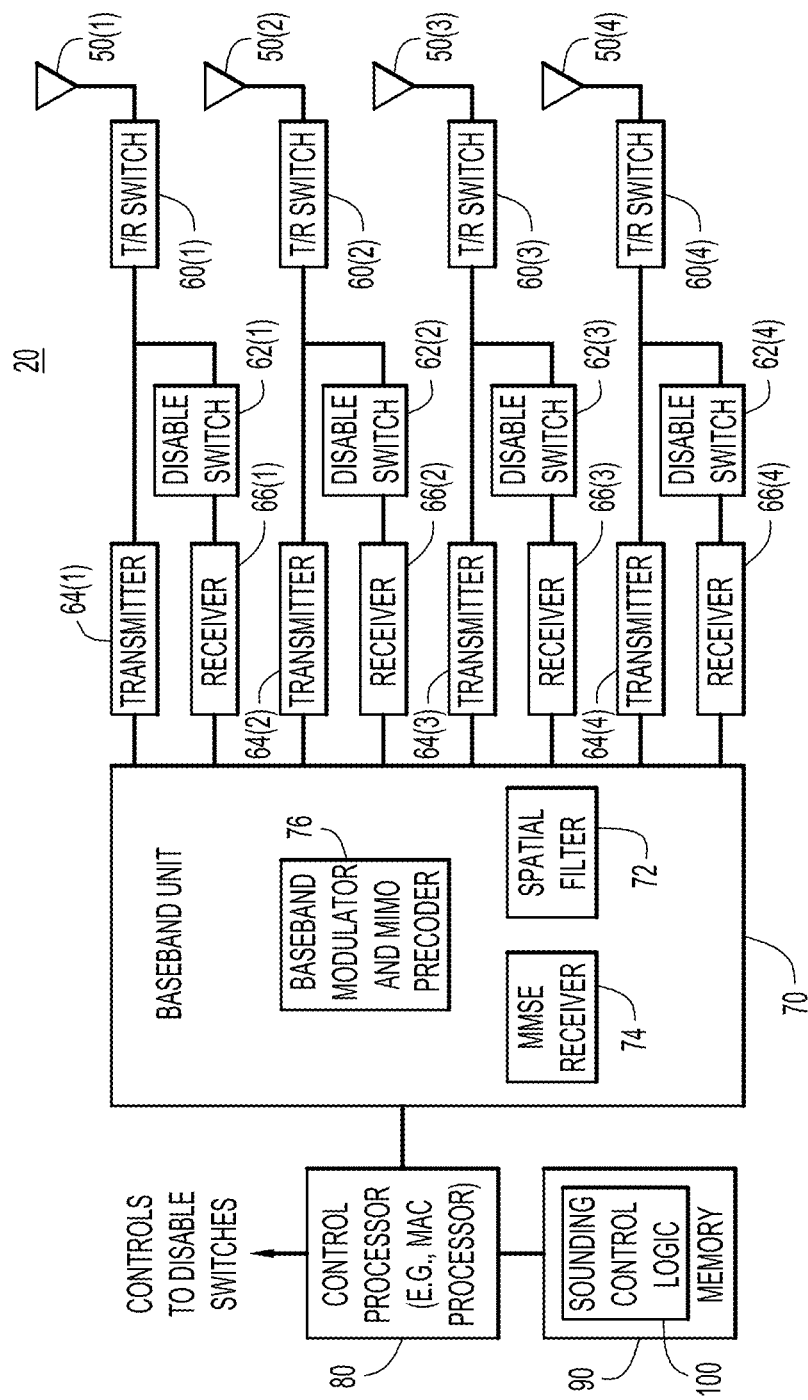
FIG. 2 is a block diagram for an example of an access point configured to perform the co-channel interference suppression techniques described herein.

Reference is now made to FIG. 2 that shows an example block diagram of an AP, generically identified by reference numeral 20, configured to perform the various techniques described herein. In this example, the AP 20 comprises four antennas 50(1)-50(4). For each antenna, there is a transmit/receive (T/R) switch, a receiver path disable switch, a radio receiver and a radio transmitter. Specifically, for antenna 50(1), there is a T/R switch 60(1), a receiver path disable switch 62(1), a radio receiver 64(1) and a radio transmitter 66(1). Similarly, for antenna 50(2), there is a T/R switch 60(2), a receiver path disable switch 62(2), a radio receiver 64(2) and a radio transmitter 66(2); for antenna 50(3), there is a T/R switch 60(3), a receiver path disable switch 62(3), a radio receiver 64(3) and a radio transmitter 66(3); and for antenna 50(4), there is a T/R switch 60(4), a receiver path disable switch 62(4), a radio receiver 64(4) and a radio transmitter 66(4).

Each of the receivers 64(1)-64(4) and transmitters 66(1)-66(4) are connected to a baseband unit 70. The baseband unit 70 is configured to perform the baseband receive and transmit signal processing for the AP. As shown in FIG. 1, the baseband unit 70 includes a receive spatial filter 72 and a Minimum Mean Squared Error (MMSE) receiver 74 for baseband receive signal processing, and a baseband modulator and MIMO pre-coder 76 for baseband transmit signal processing. The baseband unit 70 performs other various baseband signal processing functions not relevant to the techniques described herein. The spatial filter 72 may be used to perform cooperative receive suppression with respect to transmissions made by a particular co-channel AP, as described further hereinafter.

A control processor 80 is coupled to the baseband unit 70. The control processor 80 performs higher level control functions as well as media access control (MAC) control operations for the AP 20. For example, the control processor 80 generates control signals that are supplied to the receiver disable switches 62(1)-62(4) to disable output of one or more receiver paths, as needed or desired. The control processor 80 may be a microprocessor or microcontroller that executes instructions stored in memory 90. For example, the memory 90 may be an processor/computer readable memory encoded with software instructions that, when executed by the control processor 80, cause the control processor 80 to perform various operations. FIG. 2 shows that the memory stores instructions for sounding control logic 100. The sounding control logic 100 causes the control processor 80 to perform an intra-AP sounding procedure described hereinafter in connection with FIGS. 3 and 4 to allow an AP to determine which, if any, receiver paths should be disabled.

Memory 90 may comprise read only memory (ROM), random access memory (RAM), magnetic disk storage media devices, optical storage media devices, flash memory devices, electrical, optical, or other physical/tangible memory storage devices. Thus, in general, the memory 90 may comprise one or more tangible (non-transitory) computer readable storage media (e.g., a memory device) encoded with software comprising computer executable instructions and when the software is executed (by the processor 80) it is operable to perform the operations described herein.

The T/R switch for an antenna path serves to connect either a transmitter or receiver to the corresponding antenna, depending on whether the AP is in transmit mode or receive mode. The receiver path disable switch for an antenna path serves to disconnect a receiver from an antenna so that the receiver does not output a receive signal for that antenna path. The control processor 80, through execution of the sounding control logic 100, will determine which receiver path disable switch to control to isolate a receive signal for that antenna path from reaching the baseband unit 70 for baseband processing. While FIG. 1 shows the disable switch connected between the receiver and T/R switch for an antenna path, it should be understood that it could be connected between the receiver and the baseband unit 70.

Furthermore, in an alternative to the disable switches 62(1)-62(4), the control processor 80 may configure the baseband unit 70 to ignore and not process a receive signal for a particular antenna path based on the channel evaluations made by execution of the sounding process logic 100. In so doing, the baseband unit 70 will impose a null at one or more antennas of the AP with respect to a co-channel beamformed transmission by a neighboring AP to one of the neighboring AP's clients.

The reason for disabling the output of a receiver on an antenna path is to reduce the number of effective receivers of the AP so that there are fewer receivers than transmitters for any inter-AP co-channel interference. The dimension of the null-space depends on the number of receivers that are effectively nulled (generally one or two). The more receivers that are "disabled" on an adjacent AP, the more dimensions that are created to use for beamforming to a client. The result is some sacrifice of beamforming robustness but improved interference suppression, which is acceptable since the APs are at such close distances and the clients experience relatively high SNR from AP transmissions.

The architecture depicted in FIG. 2 is meant by way of example only. The various blocks shown in this figure may be distributed within several radio frequency and baseband integrated circuit chips.

Figure 3:
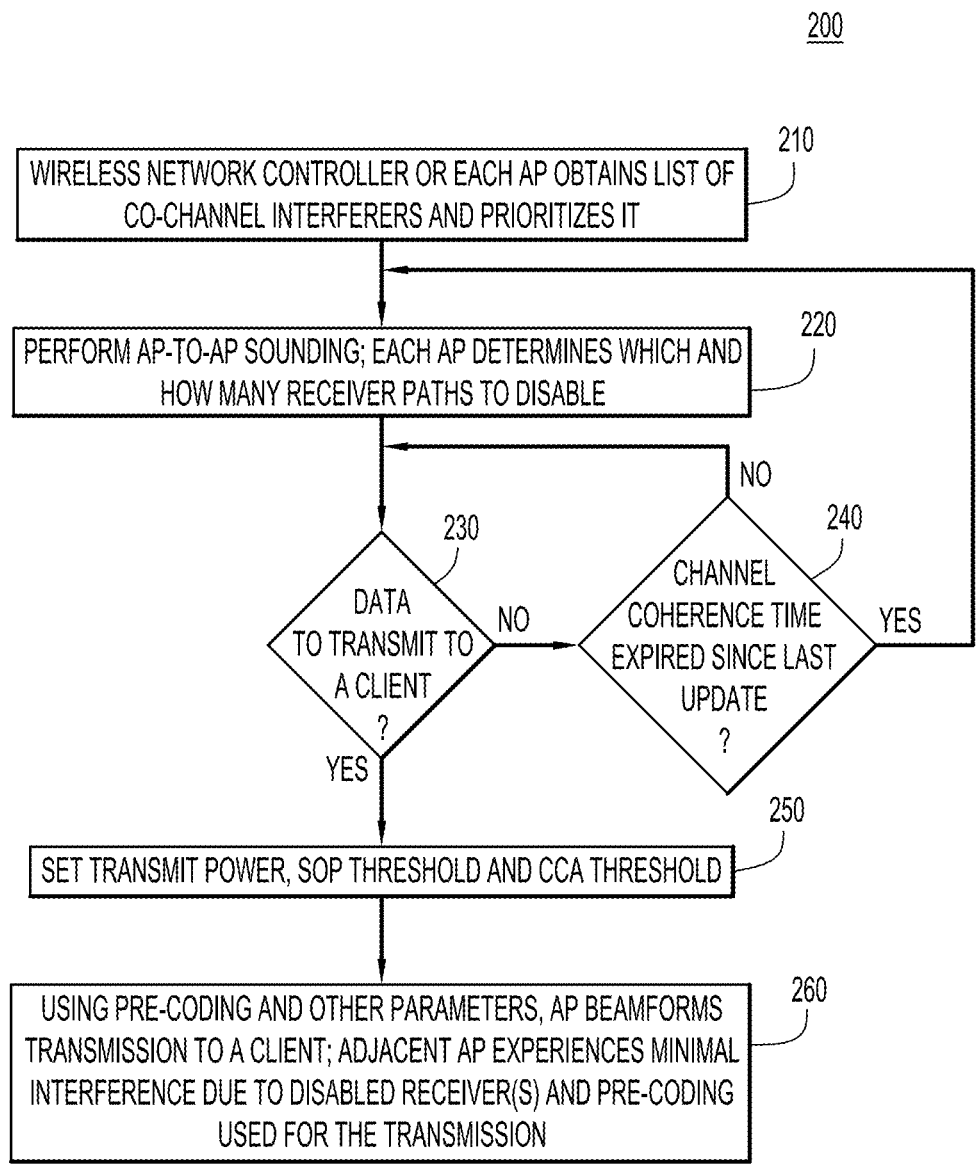
FIG. 3 is a high level flow chart depicting operations of the co-channel interference suppression techniques performed in an access point.

Reference is now made to FIG. 3 for a high level description of the operational flow, shown generally at 200, for the techniques presented herein. At 210, the wireless network controller 30 or each AP obtains a list of co-channel interferers and prioritizes the list. For example, the wireless network controller 30 may determine, based on RF channel assignment and receive signal strength information (RSSI) obtained from the APs, which APs are co-channel interferers to other APs. For a given AP, the list of co-channel APs may be prioritized by RSSI, such that the co-channel AP with the highest RSSI is at the top of the list, and so on. Again, either the wireless controller or each AP may determine and prioritize the list of its co-channel interferer APs.

Then, after each AP has a list of co-channel interferer APs, an AP-to-AP sounding procedure is performed at 220. Based on the information learned through the AP-to-AP sounding procedure, each AP determines which and how many receiver paths to disable with respect to a co-channel interferer AP. The operations associated with this step are performed when an AP executes the sounding control logic 100 (shown in FIG. 2) and is described in more detail hereinafter in connection with FIG. 4.

At 230, a given AP determines whether it has data to transmit to one of its clients. If the AP does not have any data to transmit to a client, then at 240, the AP determines whether a period of time equal to or greater than the coherence time has expired since the last sounding update. The coherence time for the APs is generally relatively long because the channel conditions for the APs, which are generally at fixed locations, is relatively static. If it is time for an update, then the AP-to-AP sounding operations 220 are performed again. It is also possible that the operations of step 210 are performed again after expiration of the coherence time in the event that new APs have come online or APs have gone offline. If the coherence time has not expired, then the procedure goes back to operation 230 to wait for data to be transmitted by the AP.

When it is determined at 230 that the AP has data to transmit, then at 250, it sets the transmit power, receive SOP threshold, and CCA threshold according to the techniques described herein. These configurations may be set earlier, after the AP-to-AP sounding procedure 220 is completed, and before the AP determines whether it has data to transmit.

For example, the receive SOP threshold upper limit can be set based on the minimum AP-to-Client coverage. Each AP predicts the level of interference suppression expected from adjacent co-channel APs. AP1 knows the expected maximum interference from the co-channel interferer AP2 from the total power in the weakest eigenmodes that AP2 will use for transmission (the null-space+the weakest subspace basis).

At 260, using the transmit pre-coding and other parameters described herein, the AP beamforms a transmission to its client and the co-channel AP(s) for that AP experiences minimal interference due to the one or more disabled receiver paths at that AP and/or due to the receiver suppression employed at that AP, according to the techniques presented herein.

Transmit to Clients with Weakest AP-to-AP Subspace Basis

In one example, the wireless channel between co-channel APs is 4×4 where the channel rank is typically four with one or two weak eigenmodes, and with the fourth eigenmode being very weak. Restricting 1 and 2 spatial stream transmissions to the weakest modes will reduce the co-channel interference. Interference is reduced by 10 dB to 12 dB on average for single spatial stream transmissions when the 4×4 channel is fully sounded and the signal stream is sent on the weakest AP-to-AP mode. The 4×4 AP-to-AP channel is full rank so the signal cannot be fully suppressed with transmit pre-coding.

In the case of a two spatial stream downlink, the AP does not have enough degrees of freedom to suppress interference to the other co-channel four receiver AP(s). When only one or two spatial stream client performance is to be optimized, the APs may be configured in a four transmitter×three receiver (4×3) mode without significant performance loss to the client uplink. In this system configuration, the four transmitter AP has sufficient degrees of freedom to fully suppress interference from single spatial stream downlinks or partially suppress interference for two spatial stream downlinks.

By reducing the AP MIMO configuration to 4×3, the single spatial stream client transmissions are fully sent in the AP-to-AP null-space while the two spatial stream transmissions are sent in the null-space and the weakest signal subspace mode (i.e., eigenvector corresponding to the smallest nonzero eigenvalue). The two spatial stream AP-to-AP suppression is improved slightly because of the loss of the power on the fourth (weakest) subspace basis. In two spatial stream downlink situations where the strongest eigenmode of the AP-to-Client channel correlates highly with the second weakest eigenmode of the AP-to-AP channel, the baseband unit in the AP can pre-code in order to allocate power away from that mode to the second strongest AP-to-Client mode to further reduce interference without being concerned about the downlink. Reducing an AP to a 4×2 configuration allows for perfect nulling to the co-channel AP while sending two spatial stream downlinks to clients. In summary, an AP can send a beamformed MIMO transmission with pre-coding parameters for a reduced MIMO configuration as to a number of spatial streams that could be transmitted to a CD.

In general, when the number of AP receivers and spatial streams are less than or equal to the number of transmit antennas, then AP-to-AP co-channel interference is fully suppressed, limited only by the CSI SNR. By cooperatively aligning the transmit configuration and pre-coding with the number of active AP receiver paths the overall system may be optimized for single spatial stream, two spatial streams or three spatial stream downlink performance.

AP-to-AP Sounding

Figure 4:
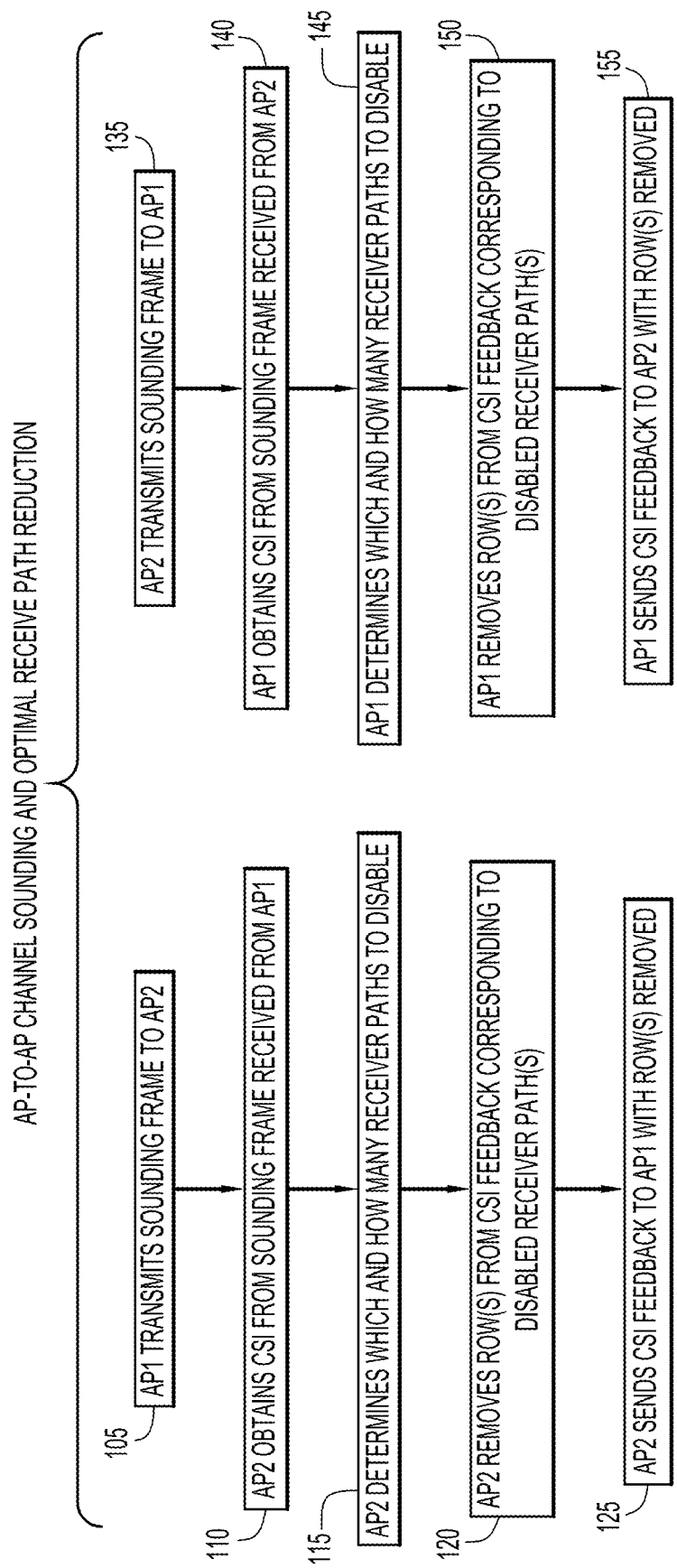
FIG. 4 is a more detailed flow chart depicting sounding operations between two access points in order to determine which one or more receiver paths should be disabled in an access point.

Turning to FIG. 4, the operations of the sounding control logic 100 is now described. The AP-to-AP sounding operations are performed as shown at 220 in FIG. 3. For simplicity of description of FIG. 4, the two APs involved in a sounding procedure are referred to simply as AP1 and AP2. It should be understood that AP1 and AP2 can be any two of the APs shown in FIG. 1 that are on each other's list of co-channel interferer APs.

Initially, each AP may be in a default 4×4 configuration, meaning transmit and receive paths for all four of its antennas are enabled. Operations 105-125 are performed for sounding transmissions sent from AP1 to AP2, and similar operations 135-155 are performed for sounding transmissions sent from AP2 to AP1.

At 105, AP1 transmits a sounding frame to AP2. At 110, AP2 receives the sounding frame at its multiple antennas from AP1 and obtains CSI from the received sounding frame. At 115, AP2 determines which and how many of its receiver paths to disable. The choice of which one or more receiver paths to disable can be based on the RSSI. In other words, the receiver path with the strongest RSSI is disabled. Alternatively, AP2 may pick an antenna configuration that minimizes the total power of the eigenvalues of the weakest subspace. At 120, AP2 removes the row(s) corresponding to the disabled receiver path(s) from the CSI that it will feedback to AP1. At 125, AP2 sends a 4×Nrx CSI matrix feedback to AP1 (with the one or more rows removed for the disabled receiver paths at AP2).

As an example, consider the channel state information matrix $H_k$ at subcarrier k at AP2, where h is the phase and amplitude response ($h=\beta e^{j\theta}$) between any AP transmit/receive antenna pair at subcarrier k, such that $H_k$ is:

$$\begin{bmatrix} h11 & h12 & h13 & h14 \\ h21 & h22 & h23 & h24 \\ h31 & h32 & h33 & h34 \\ h41 & h42 & h43 & h44 \end{bmatrix}$$

AP2 may determine that receiver path 2 is the best antenna path to disable for reception purposes in order to suppress interference for co-channel transmissions made by AP1. Thus, the CSI matrix that AP2 sends back to AP1 would take the form of:

$$\begin{bmatrix} h11 & h12 & h13 & h14 \\ & \text{Row Deleted} & & \\ h31 & h32 & h33 & h34 \\ h41 & h42 & h43 & h44 \end{bmatrix}$$

or $$\begin{bmatrix} h11 & h12 & h13 & h14 \\ h31 & h32 & h33 & h34 \\ h41 & h42 & h43 & h44 \end{bmatrix}$$

Alternatively, AP2 may convert the CSI matrix into compressed steering (cSM) information or non-compressed steering (SM) information which are standardized types of steering feedback in accordance with the IEEE 802.11n specification.

Similarly, at 135, AP2 transmits a sounding frame to AP1. AP1 obtains CSI from the received sounding frame from AP2, at 140. At 145, AP1 determines which and how many receiver paths to disable, using similar criteria as described at 115. At 150, AP1 removes one or more rows from the CSI corresponding to the one or more disabled receiver paths. At 155, AP1 sends the 4×Nrx CSI to AP2, with the one or more rows removed for the disabled receiver paths at AP1.

As explained above in connection with FIG. 3, sounding repeats at an interval needed to be within the channel coherence time between APs (which is fairly infrequent due to no movement of APs or local scatterers on ceilings).

The number of disabled receiver paths (or conversely the number of enabled receiver paths) at an AP, denoted Nrx, may be determined from the AP's client statistics and/or global optimization parameters. Client statistics may include the mix of 1×1, 2×2 and 3×3 clients, that is, the number of clients that can handle one spatial stream, two spatial streams or three spatial streams, respectively. Each AP can dynamically determine the best antenna/receive path configuration based on its own client statistics. The selection of Nrx is made to maintain sufficient receive diversity for each AP's client population uplink traffic while providing the co-channel interfering AP with as many dimensions to downlink beamform to its own clients. Alternatively, Nrx could be a global setting at the wireless network controller 30 for all APs (e.g., all APs are 4×3—transmit with four antenna paths but receive with three antenna paths.)

The number of disabled receiver paths at an AP can be optimized for uplink or downlink communications. More downlink spatial streams means fewer degrees of freedom on the transmit side available to suppress AP-to-AP interference. Therefore the number of active AP receivers can be reduced to increase the AP-to-AP null-space dimension. Again, the number of receiver paths that are disabled can be selected to optimize the coverage area for 1×1 (one spatial stream) clients (e.g., WLAN-capable phones and tablets)

AP-to-AP sounding may be performed by IEEE 802.11n explicit sounding with delayed CSI feedback. However, sounding could be done with any kind of feedback. Explicit sounding allows for receiver paths to be disabled while still sounding the channel for all transmit paths.

Alternatively, if the precision on the implicit CSI is sufficient to avoid quantization errors in the CSI, the disabling of the receiver paths can be done by applying attenuation, through which CSI is still captured for all receiver chains and scaled to remove attenuation, allowing for full sounding of the channel.

Another option is for the AP to periodically go into full (four) receiver mode for the full channel sounding. AP-to-AP implicit sounding updates are controlled at the receive side. The AP may selectively enable all receive paths when the AP-to-AP CSI is stale or by monitoring the Nrx<4 paths to detect a change in channel state.

AP-to-Client Sounding

If AP receiver chains are disabled by attenuation and the CSI precision is sufficient to avoid large quantization errors, CSI can still be captured on the "disabled" receiver chains and scaled to remove attenuation. This will add noise to the CSI relative to the other receiver chains, but can still provide for good performance.

If the receiver chains are truly disabled, the AP-to-Client implicit sounding updates are limited by the number of active receiver paths. In those cases, zeros can be used in place of disabled receiver path's row in the CSI matrix. This does not impact beamforming to the client within the AP-to-AP null-space. One alternative is to intermittently enable all antenna paths for reception in order to fully sound channel conditions between an AP and a client served by that AP.

The client environment is expected to change rapidly so that infrequent fully sounded channel updates may not be useful and intermittent re-enabling of all receive paths is only sometimes an option. Other alternatives include continuously cycling through the receiver paths and combining CSI data across multiple uplink frames to form the complete channel CSI/covariance matrix. This can be done for the AP-to-AP sounding updates as well. The disadvantage of continuous receiver path cycling is the optimal receiver path to suppress AP-to-AP interference may not always be selected. Still another alternative is to use explicit sounding to clients that support the IEEE 802.11n or 802.11ac sounding protocols. When all clients support this feature then the optimal receiver path may always be disabled. Still it is only necessary when beamforming is to be used to the client which is not always necessary or desired when favoring AP-to-AP interference suppression.

Dynamic Rate Selection with Beamforming and Interference Suppression

In a rate-selection algorithm, it may be desired to select a rate to beamform with or to suppress interference. If a minimum rate is sustained without beamforming, then an interference suppression vector is used, otherwise the beamform weight vector is used. Consequently, the capacity is maximized since most clients in a high density deployment will sustain one or two spatial stream rates without beamforming, and the excess client SNR is an available trade-off to apply AP-to-AP co-channel interference suppression.

Dynamic rate adaptation may be biased toward Number of Spatial Streams (Nsts)≤Ntx−Nrx rates to maximize interference suppression, where Ntx is the number of transmit antennas at an AP and Nrx is as defined above. Under this condition the AP-to-AP interference is fully suppressed. For a small number of client positions or frames, the interference may not be suppressed; however the majority of data will be sent with suppression. Alternately, dynamic rate adaptation can be configured to always apply suppression and rate shift to a lower downlink rate. In summary, a transmitting AP may perform rate selection for a wireless client device to favor interference suppression over data throughput, or to adapt to traffic conditions at the wireless client device or to adapt to traffic conditions in the wireless local area network.

Receive Side AP Dynamic Configuration for Interference Suppression

An AP may selectively enable all receiver paths for the purpose of modifying the receiver path(s) to disable from a fully sounded channel. The AP may be prompted to do this after a Null Data Packet (NDP) announcement of a sounding frame, change in CSI between APs (does not need to be a full channel sounding) or periodically (random or at a regular interval). The AP receives a sounding frame from a co-channel AP, obtains CSI estimates, cycles through all possible receiver path configurations and identifies the receiver path(s) to disable which yields the weakest modes between the APs.

The AP can selectively disable/enable or attenuate a receiver path depending on the amount of uplink 3-spatial stream traffic and/or quality of the 3-spatial stream traffic uplinks. This is dynamic and possibly changing frequently, so the AP can control this setting locally. In other words, the AP can selectively attenuate one or more antenna paths for reception based on channel conditions in order to maximize interference suppression for a transmission made by a co-channel AP.

SOP and CCA Adjustment with AP-to-AP Interference Suppression Statistics

The receive SOP threshold may be adjusted to provide an expected minimum coverage for clients. In addition, the APto-AP observed frames are measured. These frames are transmitted at times using interference suppression so the statistics of the interference (probability of interference exceeding a threshold) is used to adjust receive SOP threshold. This is dynamically adjusted at the AP in response to the quality of the interference suppression (channel estimate noise/age reduce effectiveness), the amount of co-channel interference (highly dependent on the ratio of single to two spatial stream downlink since a single spatial stream downlink will have better interference suppression), the expected suppression (strength of weakest eigenmodes), the receiver configuration (reduced rank setting, e.g., 3 receivers enabled), etc.

Figure 5:
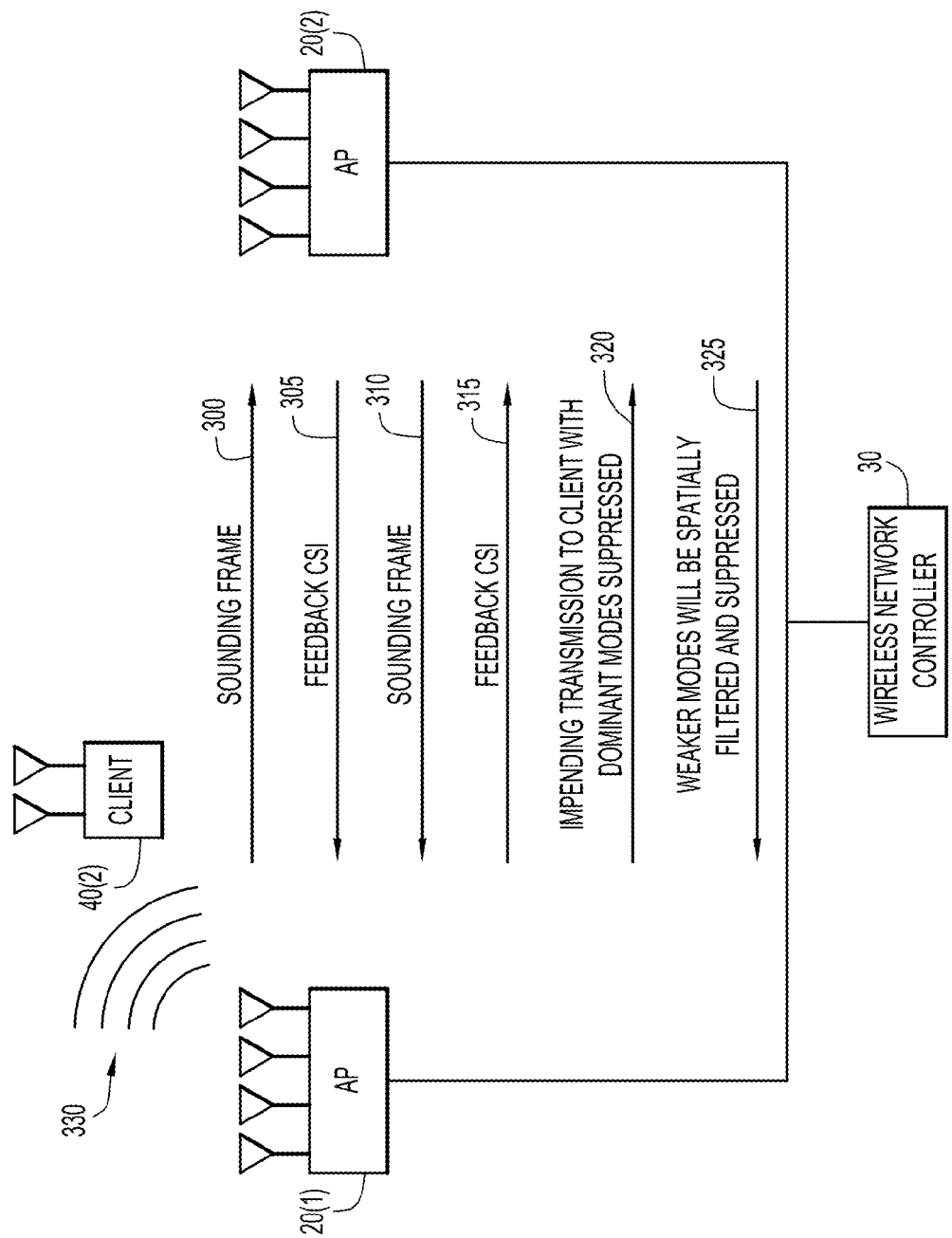
FIG. 5 is a diagram of two access points that perform cooperative transmit pre-coding and receive spatial filtering co-channel interference suppression.

Cooperative T/R Interference Suppression when the Receiver Includes Interference Suppression Filter In the case of a receiver possessing interference suppression capability such as a spatial filter ahead of the MMSE receiver, as shown in FIG. 2, two co-channel APs may fully cooperate with each other to reduce co-channel interference. Reference is now made to FIG. 5, which shows a configuration in which two APs cooperate with each other for interference suppression. FIG. 5 shows APs 20(1) and 20(2) as an example, both in communication with the wireless network controller 30. Each AP is configured for 4×4 MIMO. As shown at reference numerals 300, 305, 310 and 315, the APs perform sounding to each other. In this case, the feedback CSI made be the full CSI matrix (without any rows removed). Thus, the fully sounded channel between APs is known at both the APs. In this example, AP 20(1) is the transmitting AP with respect to a transmission that it will make to client 40(2) associated with AP 20(1) and AP 20(2) is the co-channel receiving AP with respect to the co-channel transmission that AP 20(1) is about to make to client 40(2).

The APs 20(1) and 20(2) may be configured to "agree" ahead of time to suppress the dominant modes at the transmitting AP 20(1), and to suppress the weaker modes at the receive side spatial filter at AP 20(2). For example, at 320, AP 20(1) sends a message to AP 20(2) in order to notify AP 20(2) that AP 20(1) has an impending transmission to a client and that it will be sent with dominant modes suppressed. At 325, AP 20(2) responds with a message notifying AP 20(1) that AP 20(2) will perform receive spatial filtering suppression of the weaker modes of the transmission that are received at AP 20(2). In this way, the transmit and receive degrees of freedom are combined for sending multiple spatial streams, receiving multiple spatial streams and/or rejecting interference between APs. Additionally, the receive interference suppression spatial filter at the receiving AP, e.g., AP 20(2), may be capable of per-subcarrier processing to cooperate with the per-subcarrier processing at the transmitting AP, e.g., AP 20(1). As an alternative to the explicit advanced notification between APs, the APs may be configured to use the inter-AP fully sounded channel information when sending a client transmission such that the transmitting AP always transmits with the dominant modes suppressed and the co-channel AP always suppresses the weaker modes associated with the reception of the other APs transmission.

Thus, in summary, FIG. 5 depicts a scenario in which in advance of a transmission to be made by a first AP to one of its associated clients, a communication is made to a co-channel second AP in proximity to the first AP, to provide a notification that the transmission will be sent with dominant modes suppressed. The first AP receives a communication back from the second AP notifying the first AP that the second AP will suppress weaker modes of the transmission, e.g., with receive spatial filtering. Thereafter, the first AP sends the transmission to its client.

Alternative Method to Pre-Coding and Suppression Vectors

Transmit pre-coding by an AP may be based on a linear combination of one or more weakest eigenvector(s) and one or more null-space vector(s). The numerical implementation of the singular value decomposition (SVD) to find the complete basis for the signal and null-spaces may not yield stable results. An alternative is to obtain a linear combination of one or more of the weakest eigenvector(s) and one or more null-space vector(s) from orthogonalization of the dominant eigenvectors. Both the weakest eigenvector and null-space are orthogonal to the dominant eigenvectors, so it is possible to construct a linear combination by forcing an orthogonality constraint and implementing a closed-form expression for a 2×2 or 3×3 matrix inversion.

Similar to its use for transmit pre-coding, receive interference suppression with respect to a transmission sent by a co-channel AP may be based on a linear combination of one or more weakest eigenvectors and one or more null-space vectors. The channel H used in determining the transmit (Tx) pre-coding is modified to be a total channel quantity $H=a_1*H_1'*H_1+a_2*H_2'*H_2+ \ldots a_n*H_n'*H_n$, per subcarrier, where H=UDV', and U, D, V are matrices used in SVD decomposition, and ' denotes the conjugate transpose, for co-channel APs 1 to n. D is a matrix containing the singular values, V is the steering matrix and U is a unitary matrix. The columns of steering matrix V that are associated with the weakest modes of the channel are the ones used for Tx pre-coding. $H_n$ represents the channel between the AP and the nth co-channel AP ($AP_n$), $a_n$ represents the weighting that the channel information for that co-channel AP is given (a=0 would completely exclude that co-channel from consideration).

There are several ways to choose the values for the weights $a_n$ for the channel information between the AP and the N other APs. First, the amount of uplink/downlink traffic observed to/from $AP_n$ (if there is no traffic on the AP, it is a waste and not necessary to null it). An additional monitor radio may be used to collect uplink/downlink statistics of co-channel APs for this purpose. Second, RSSI may be used for weight selection. For example, $a_n$=0 for those APs that are not among the highest Z RSSI APs (where the list is trimmed based on RSSI). Third, correlation of null-space to beamforming weights of the client is performed to avoid completely nulling the client. If the null-space of the client and the $H_n$ are correlated above some threshold, $a_n$ is set to a lower value.

Thus, it is possible that the channel matrix H for all co-channel APs or a subset of them may be included in computing the total channel quantity H, also on a per-subcarrier basis. The subset would be chosen based on any number of factors, such as the RSSI of a co-channel AP, or APs with null-space correlation to a client's beamforming vector being above some threshold, but without nulling the client in the process.

If there are multiple co-channel APs, each AP can store pre-coding parameters based on the individual $H_n$ to $AP_n$. On a per-client per-subcarrier basis, an AP may select the pre-coding parameters that best match the ideal pre-coding parameters (beamforming vectors) for a client device of that AP. The AP can get as close a possible to the ideal beamforming vectors for that client while nulling 1 of N co-channel APs. The "best" pre-coding parameters in this context may be determined by a cost function between beamforming and suppression.

A similar procedure may be followed for the receive (Rx) side suppression. In one suboptimal form, there will be some overlap between Rx and Tx suppression coverage. Again, the channel $H=a_1*H_1'*H_1+a_2*H_2'*H_2+\ldots a_n*H_n'*H_n$, H=UDV'.

The receive suppression filter is sU, where U is the matrix identified above and s is a diagonal matrix used to attenuate the rows where the interference is focused. For example in a 4 receiver system, if the strongest mode is to be suppressed and that mode was represented by row 1 of the matrix U, then $$s = \begin{bmatrix} 0 & 0 & 0 & 0 \\ 0 & 1 & 0 & 0 \\ 0 & 0 & 1 & 0 \\ 0 & 0 & 0 & 1 \end{bmatrix}.$$

In another example, CSI is not shared across all co-channel APs. Instead, each AP only has information about the sounding exchange that it is involved in. Each AP starts off with an initial Rx suppression filter. As it engages in sounding with co-channel APs, it updates its Rx suppression filter as in the suboptimal method, referred to above. Each AP, after updating its Rx suppression filter per the suboptimal method, also modifies the CSI or SM information to account for that mode of the channel being suppressed on the Rx side. In a quasi-static channel, after a round of sounding, the Rx suppression filter converges to the desired multi-AP suppression, and consequently the Tx pre-coding/CSI that is fed back to co-channel APs during explicit sounding converges in subsequent exchanges.

Figure 6:
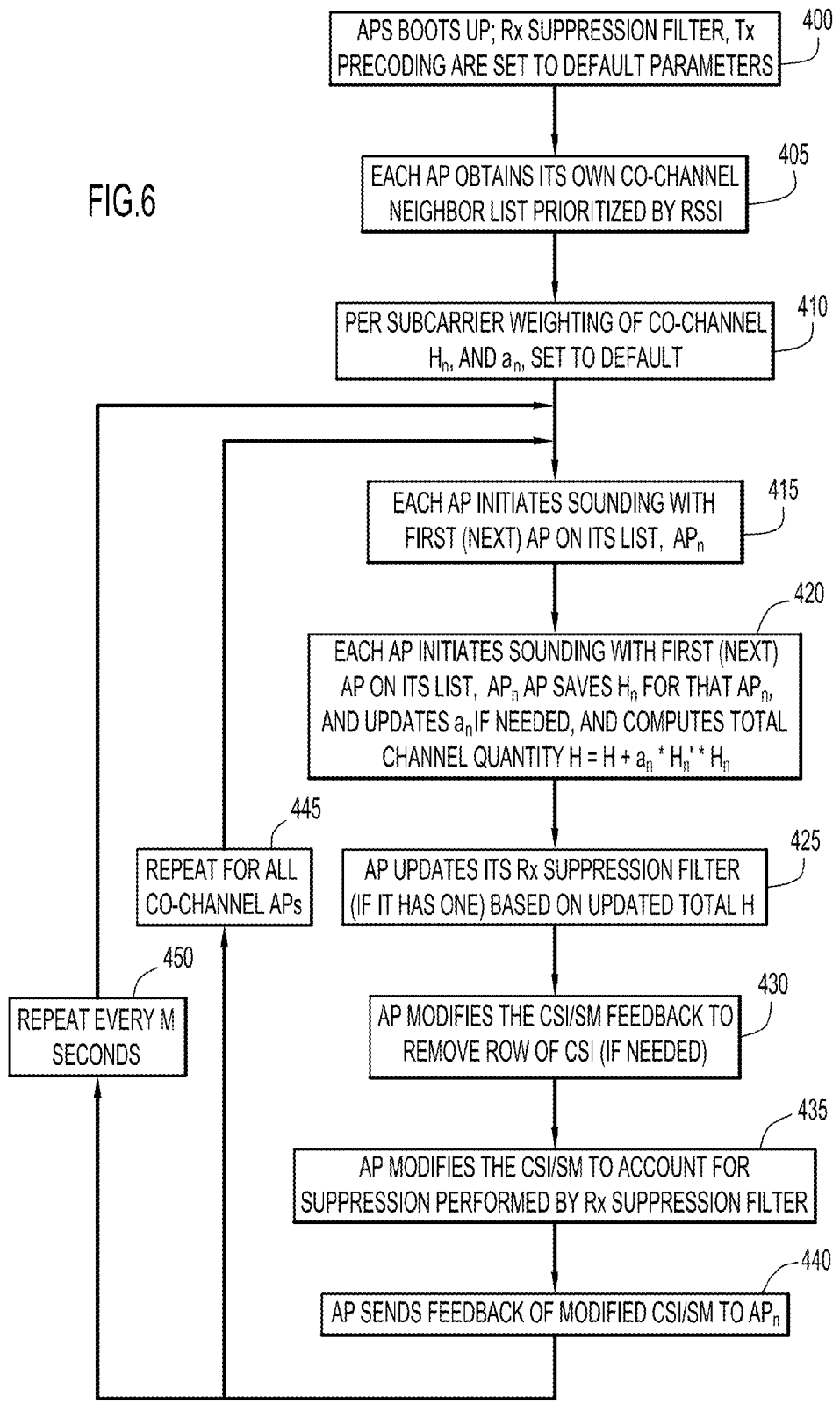
FIG. 6 illustrates a flow chart for a more generalized presentation of the transmit pre-coding receive spatial filtering co-channel interference suppression concepts.

Turning now to FIG. 6, a flow chart summarizing and generalizing the transmit pre-coding and receive interference suppression techniques is now described. Each co-channel AP performs the operations depicted in FIG. 6. At 400, the AP boots up, and the Rx suppression filter (if the AP has one) and Rx pre-coding parameters are set to some default values/settings. At 405, each AP obtains its own co-channel neighbor AP list prioritized by RSSI (through controller or neighbor discovery packets), as described above. At 410, the per-subcarrier values of co-channel matrix $H_n$ and weights $a_n$, are set to defaults values. At 415, each AP initiates sounding with a first (next) of its co-channel APs on its list of co-channel APs, e.g., generically identified as $AP_n$. At 420, the AP saves $H_n$ for that $AP_n$ and updates $a_n$, if needed, and computes a total channel quantity $H=H+a_n*H_n'*H_n$. At 425, the AP updates its Rx suppression filter (if it has an Rx filter) based on the updated total H, for suppressing interference associated with transmissions made by one of its plurality of co-channel APs (to an associated client device). At 430, the AP modifies the CSI/SM feedback to the $AP_n$ to remove a row of CSI (if needed), as described previously. At 435, the AP modifies the CSI/SM to account for suppression with the Rx filtering that may be performed. At 440, the AP sends the modified feedback CSI/SM to $AP_n$. As shown at 445, operations 415-440 are repeated for each co-channel AP, and at 450, operations 415-440 are repeated (again for all co-channel APs) on a periodic basis, e.g., every M seconds. When there are multiple co-channel APs, a round-robin exchange is made between all co-channel AP pairs to determine CSI.

In summary, the techniques presented in connection with FIGS. 5 and 6 involve cooperative transmit pre-coding and receive interference suppression that is configured from knowledge of the AP-to-AP channel conditions. Pre-coding is set for all downlink frames and updated based only on the state of the AP-to-AP channel.

In general, as explained herein in connection with FIGS. 1-6, a given AP dynamically adjusts the rank of the channel with respect to other co-channel APs by enabling/disabling unneeded receive paths. This is to be contrasted with other techniques, such as Multi-User MIMO (MU-MIMO), which require receive side suppression based on knowledge of the AP-to-Client channel conditions on all spatial streams (intended and unintended to that client) and requires additional resolvable training fields.

Moreover, unlike MU-MIMO, the co-channel APs and co-channel clients operate independently as to when to transmit. No attempt is made, nor is it needed, to align co-channel frames, such as from a single transmitter system sending MU downlink frames.

Hidden Nodes

For the vast majority of WLAN use cases, the channels decorrelate rapidly with client location. The density of hidden nodes does not increase with beamforming; rather the specific location of a potential hidden node is "effectively moved" when beamform pre-coding is applied.

Rate selection is dynamic in accordance with the techniques described herein. No bias is given to beamformed or non-beamformed rates. Hidden nodes result in collisions at the client and frame retries. Rate selection adjusts to optimize the throughput with beamformed or non-beamformed rates. The APs can be configured to operate in the cases where beamforming to a particular client has unwanted side-effects.

Impact on the Client

As explained above, the transmit degrees of freedom are used for beamforming or AP-to-AP interference suppression and/or some combination. The channels between AP and clients are decorrelated due to local scatters in the proximity of the client. This is certainly true for indoor channels, but also is the case in many stadium type scenarios.

Even if the AP-to-Client channel is highly correlated to the AP-to-AP channel over a few subcarriers, those few subcarriers can be suppressed. The impact to suppression is small since the number of uncorrelated subcarriers would be much greater than the correlated ones. Alternatively, pre-coding could be made between full suppression and full beamforming depending on correlation of the AP-to-AP channel to AP-to-Client channel on a per-subcarrier basis. Considering the high density environment in which these techniques are useful, where high SNR is expected due to small cells and line-of-sight situations, the actual downlink throughput will not suffer much from reduced beamforming. Furthermore, since the AP-to-Client channels are not correlated with the AP-to-AP channels, AP-to-AP interference suppression and no pre-coding are equivalent from the perspective of a client device.

To summarize, for the simple situation of a first access point having at least one co-channel second access point, the first access point is configured to beamform a transmission from its plurality of antennas to an associated wireless client device within a null-space or with the weakest singular eigenmodes of a wireless channel between the first access point and the at least one co-channel second access point. The second access point may also perform receive side suppression of the co-channel transmission made by the first access point.

In addition, from the perspective of an access point equipped to perform the co-channel interference suppression techniques presented herein, the access point includes a baseband processor configured to generate a plurality of pre-coded transmit signals for a beamformed transmission to a wireless client device within a null-space or with the weakest singular eigenmodes of a wireless channel with respect to at least one co-channel second access point, and a transmitter coupled to the baseband processor. The transmitter is configured to supply the pre-coded transmit signals to a respective one of a plurality of antennas for transmission. Moreover, in order to suppress co-channel interference associated with a transmission made by a co-channel access point, the baseband signal processor is configured to generate parameters for a receive suppression filter.

From a system perspective, a system is provided comprising a plurality of access points in a wireless local area network, each access point configured to serve one or more wireless client devices, wherein at least one access point being configured to generate a plurality of pre-coded transmit signals for a beamformed transmission to an associated wireless client device within a null-space or with the weakest singular eigenmodes of a wireless channel with respect to at least one co-channel access point of the plurality of access points.

The above description is intended by way of example only. Various modifications and structural changes may be made therein without departing from the scope of the concepts described herein and within the scope and range of equivalents of the claims.

What is claimed is:

1. A method comprising:
    at a first access point in a wireless local area network, the first access point having a plurality of antennas, beamforming a transmission from the plurality of antennas to a wireless client device within a null-space or with the weakest singular eigenmodes of a wireless channel between the first access point and at least one co-channel second access point; and
    determining the null-space or the weakest singular eigenmodes between the first access point and the second access point, wherein determining the null-space or weakest singular eigenmodes comprises:
        at the second access point, determining one or more antennas paths for which to disable reception in order to suppress co-channel interference associated with transmissions made by the first access point; and
        receiving channel state information from the second access point at the first access point, the channel state information indicating which one or more antennas paths are to be disabled at the second access point.

2. The method of claim 1, further comprising receiving a sounding transmission from the first access point at a plurality of antennas of the second access point, and determining the one or more antenna paths to disable reception based on reception of the sounding transmission.

3. The method of claim 2, wherein determining the one or more antenna paths to disable based on relative receive signal strength of the sounding transmission at the plurality of antennas.

4. The method of claim 2, wherein determining the one or more antenna paths to disable based on an antenna configuration that minimizes a total power of eigenvalues of the weakest subspace computed from the received sounding transmission.

5. The method of claim 1, wherein receiving channel state information comprises receiving a channel state information matrix with one or more rows removed to indicate the one or more antenna paths that have been disabled at the second access point.

6. The method of claim 1, further comprising, at the second access point, disabling the one or more antennas paths for reception by a switch that is responsive to a control signal to isolate a receive signal for a corresponding antenna path from being baseband processed.

7. The method of claim 1, further comprising, at the second access point, disabling the one or more antennas paths for reception by ignoring and not processing a receive signal for a corresponding antenna path.

8. The method of claim 1, further comprising, at the second access point, selectively attenuating one or more antenna paths for reception based on channel conditions in order to maximize interference suppression for a transmission made by the first access point.

9. The method of claim 1, further comprising, at the second access point, enabling all antenna paths for reception in order to fully sound channel conditions between the second access point and a wireless client device served by the second access point.

10. The method of claim 1, wherein beamforming comprises beamforming a multiple-input multiple-output spatial stream transmission, wherein a number of spatial streams is based on the number of antenna paths at the second access point that have been selected to be disabled to suppress a co-channel transmission made by the first access point and received at the second access point.

11. The method of claim 1, wherein there are a plurality of co-channel access points with respect to the first access point, and determining comprises computing channel state information for each of the plurality of co-channel access points, and computing a total channel quantity according to $a_1 * H_1'* H_1 + a_2 * H_2'* H_2 + \ldots a_n * H_n'* H_n$ for the plurality of co-channel access points 1 to n, where $H_1$-$H_n$ are channel state matrices for co-channel access points 1 to n, $a_1$ to $a_n$ are weights for respective ones of the plurality of co-channel access points and ' denotes a conjugate transpose, wherein beamforming comprises beamforming using pre-coding parameters derived from the total channel quantity.

12. The method of claim 11, further comprising setting values for the weights $a_1$ to $a_n$ based on one or more of: observation of traffic to and from a given co-channel access point, receive signal strength associated with a co-channel access point, or correlation of a null-space to beamforming weights for the client device to avoid completely nulling the client device of the first access point.

13. The method of claim 11, further comprising the first access point device storing pre-coding parameters for each of the plurality of co-channel access points, and selecting pre-coding parameters that best match ideal pre-coding parameters for the client device of the first access point.

14. The method of claim 1, further comprising setting one or more of a receive start-of-packet threshold and a clear channel assessment threshold at the second access point based on a level of interference suppression with respect to transmissions of the first access point.

15. The method of claim 1, further comprising applying a receive spatial filter to receive signals at the plurality of antennas of the second access point to suppress a co-channel transmission sent by the first access point to a wireless client device associated with the first access point.

16. The method of claim 1, wherein beamforming the transmission comprises beamforming a multiple-input multiple-output transmission using pre-coding parameters for a reduced multiple-input multiple-output configuration as to a number of spatial streams that could be transmitted by the first access point to the wireless client device.

17. The method of claim 1, further comprising performing rate selection for the wireless client device at the first access point to favor interference suppression over data throughput, to adapt to traffic conditions at the wireless client device or to adapt to traffic conditions in the wireless local area network.

18. The method of claim 1, wherein beamforming comprises beamforming the transmission to the wireless client device with dominant modes of the wireless channel between the first access point and second access point suppressed, and further comprising at the second access point, suppressing weaker modes of the channel between the first access point and second access point.

19. The method of claim 18, further comprising the first access point and the second access point communicating with each other for notification in advance of the transmission to indicate that the transmission will be sent by the first access point with dominant modes suppressed and that the second access point will suppress weaker modes.

20. The method of claim 18, further comprising the first access point generating the transmission to be sent to the wireless client device with a linear combination of one or more weakest eigenvectors and one or more null-space vectors.

21. The method of claim 20, wherein generating comprises computing the linear combination of the one or more weakest eigenvectors and one or more null-space vectors from orthogonalization of the dominant eigenvectors.

22. The method of claim 18, further comprising the second access point performing interference suppression with respect to the transmission by the first access point using a linear combination of one or more weakest eigenvectors and one or more null-space vectors.

23. A wireless access point comprising:
 a baseband processor configured to generate a plurality of pre-coded transmit signals for a beamformed transmission to a wireless client device within a null-space or with the weakest singular eigenmodes of a wireless channel with respect to at least one co-channel second access point;
 a transmitter coupled to the baseband processor and configured to supply the pre-coded transmit signals to a respective one of a plurality of antennas for transmission; and
 a controller coupled to the baseband processor, wherein the controller is configured to determine the null-space or the weakest singular eigenmodes based on channel state information received from the second access point and generated from a transmission sent to the second access point, wherein the channel state information indicates which one or more antennas paths are to be disabled at the second access point.

24. The wireless access point of claim 23, wherein the controller is configured to supply pre-coding parameters to the baseband processor to in order to beamform a multiple-input multiple-output spatial stream transmission, wherein a number of spatial streams is based on the number of antenna paths at the second access point that have been selected to be disabled to suppress a co-channel transmission received at the second access point.

25. The wireless access point of claim 23, wherein the baseband processor is configured to compute channel state information for each of a plurality of co-channel access points, and to compute a total channel quantity according to $a_1 * H_1'* H_1 + a_2 * H_2'* H_2 + \ldots a_n * H_n'* H_n$ for the plurality of co-channel access points 1 to n, where $H_1$-$H_n$ are channel state matrices for co-channel access points 1 to n, $a_1$ to $a_n$ are weights for respective ones of the plurality of co-channel access points and ' denotes a conjugate transpose, and to generate pre-coding parameters derived from the total channel quantity.

26. The wireless access point of claim 23, wherein the baseband processor is configured to compute channel state matrices $H_1$-$H_n$ from a separate sounding frame exchange with each of the plurality of co-channel access points.

27. The wireless access point of claim 23, wherein the baseband processor is further configured to generate parameters for a receive suppression filter based on the total channel quantity for suppressing interference associated with transmissions made by one of the plurality of co-channel access points.

28. A system comprising:
 a plurality of access points in a wireless local area network, each access point configured to serve one or more wireless client devices;
 at least one first access point being configured to generate a plurality of pre-coded transmit signals for a beamformed transmission to an associated wireless client device within a null-space or with the weakest singular eigenmodes of a wireless channel with respect to at least one co-channel second access point of the plurality of access points, wherein the transmission is beamformed with dominant modes of the wireless channel between the first access point and the second access point suppressed, and wherein the channel between the first access point and the second access point includes weaker modes that are suppressed at the second access point.

29. The system of claim 28, wherein the at least one access first point is configured to compute channel state information for each of a plurality of co-channel access points, and to compute a total channel quantity according to $a_1 * H_1'* H_1 + a_2 * H_2'* H_2 + \ldots a_n * H_n' H_n$ for the plurality of co-channel access points 1 to n, where $H_1$-$H_n$ are channel state matrices for co-channel access points 1 to n, $a_1$ to $a_n$ are weights for respective ones of the plurality of co-channel access points and ' denotes a conjugate transpose, the at least one first access point generates pre-coding parameters derived from the total channel quantity.

30. The system of claim 29, wherein the at least one first access point is configured to compute channel state matrices $H_1$-$H_n$ from a separate sounding frame exchange with each of the plurality of co-channel access points.

31. The system of claim 29, wherein the at least one first access point is configured to compute parameters for a receive suppression filter based on the total channel quantity, for suppressing interference associated with transmissions made by one of the plurality of co-channel access points.

32. A method comprising:
 at a first access point in a wireless local area network, the first access point having a plurality of antennas, beamforming a transmission from the plurality of antennas to a wireless client device within a null-space or with the weakest singular eigenmodes of a wireless channel between the first access point and at least one co-channel second access point,
 wherein the beamforming comprises beamforming the transmission to the wireless client device with dominant modes of the wireless channel between the first access point and second access point suppressed; and
 at the second access point, suppressing weaker modes of the channel between the first access point and second access point.

33. The method of claim 32, further comprising the first access point and the second access point communicating with each other for notification in advance of the transmission to indicate that the transmission will be sent by the first access point with dominant modes suppressed and that the second access point will suppress weaker modes.

34. The method of claim 32, further comprising the first access point generating the transmission to be sent to the wireless client device with a linear combination of one or more weakest eigenvectors and one or more null-space vectors.

35. The method of claim 34, wherein generating comprises computing the linear combination of the one or more weakest eigenvectors and one or more null-space vectors from orthogonalization of the dominant eigenvectors.

36. The method of claim 32, further comprising the second access point performing interference suppression with respect to the transmission by the first access point using a linear combination of one or more weakest eigenvectors and one or more null-space vectors.

* * * * *